United States Patent
Nishizawa (10) Patent No.: US 10,155,425 B2
(45) Date of Patent: Dec. 18, 2018

(54) COIL SPRING FOR VEHICLE SUSPENSION

(71) Applicant: NHK SPRING CO., LTD., Yokohama-shi, Kanagawa (JP)

(72) Inventor: Shinichi Nishizawa, Walled Lake, MI (US)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 6 days.

(21) Appl. No.: 15/421,372

(22) Filed: Jan. 31, 2017

(65) Prior Publication Data

US 2018/0215224 A1 Aug. 2, 2018

(51) Int. Cl.
*B60G 11/14* (2006.01)
*F16F 1/12* (2006.01)
*B60G 3/02* (2006.01)

(52) U.S. Cl.
CPC ............. *B60G 11/14* (2013.01); *B60G 3/02* (2013.01); *F16F 1/123* (2013.01); *B60G 2206/426* (2013.01); *B60G 2206/81035* (2013.01)

(58) Field of Classification Search
CPC .... B60G 11/14; B60G 3/02; B60G 2206/426; B60G 2206/81035; F16F 1/123
USPC ........................................ 267/179, 166, 268
See application file for complete search history.

(56) References Cited

U.S. PATENT DOCUMENTS

| | | | | |
|---|---|---|---|---|
| 2,026,007 A | * | 12/1935 | White | F16F 1/06 267/166 |
| 5,769,722 A | * | 6/1998 | Uehara | F16F 15/12313 267/180 |
| 8,490,285 B2 | * | 7/2013 | Knebel, III | F16F 1/043 267/167 |
| 2006/0220338 A1 | | 10/2006 | Orimoto et al. | |
| 2013/0099435 A1 | | 4/2013 | Matsuoto et al. | |
| 2016/0046164 A1 | * | 2/2016 | Yamamotoya | B60G 11/14 267/286 |

FOREIGN PATENT DOCUMENTS

| | | |
|---|---|---|
| CA | 2981220 A1 | 10/2016 |
| JP | 56003330 A | 1/1981 |
| JP | 60029938 U | 2/1985 |
| JP | 10281197 A | 10/1998 |
| JP | 2000272535 A | 10/2000 |

(Continued)

OTHER PUBLICATIONS

International Search Report (ISR) and Written Opinion dated Mar. 13, 2018 issued in counterpart International Application No. PCT/JP2017/047280.

*Primary Examiner* — Melanie Torres Williams (74) *Attorney, Agent, or Firm* — Holtz, Holtz & Volek PC (57) ABSTRACT

A coil spring for use in a link-motion-type suspension includes a lower end turn portion, an upper end turn portion, and an effective portion of a cylindrical shape between the lower end turn portion and the upper end turn portion. Further, the coil spring includes a bowing control portion including a taper portion formed in at least one end turn portion of the lower end turn portion and the upper end turn portion. The taper portion has a shape whose thickness is reduced from the middle of the end turn portion toward a distal end of a wire along its length, and bowing of the effective portion is suppressed by absorbing a change in the inclination of a spring seat by the taper portion.

8 Claims, 7 Drawing Sheets

(56) References Cited

FOREIGN PATENT DOCUMENTS

| | | |
|---|---|---|
| JP | 2004210211 A | 7/2004 |
| JP | 2008018784 A | 1/2008 |
| JP | 2011002095 A | 1/2011 |
| JP | 2012211702 A | 11/2012 |
| JP | 2015036565 A | 2/2015 |
| JP | 2016191445 A | 11/2016 |

* cited by examiner

COIL SPRING FOR VEHICLE SUSPENSION

BACKGROUND OF THE INVENTION

1. Field of the Invention

The present invention relates to a coil spring for a vehicle suspension which is used in a link-motion-type suspension of a vehicle such as a car.

2. Description of the Related Art

As a method of producing a coil spring, a method of forming the coil spring by hot working and a method of forming the coil spring by cold working are known. The coil spring formed by hot working is formed into a helical shape by winding a wire that is heated to a high temperature (for example, an austenitizing temperature of steel) around a mandrel at a predetermined pitch. The length of the wire is equivalent to that of one coil spring. In this specification, an apparatus which produces a coil spring by hot working is referred to as a hot forming coiling machine, and the coil spring formed by hot working is referred to as a hot formed coil spring. Since the hot forming coiling machine winds a wire which has been softened as a result of heating around the mandrel, it is suitable for producing a coil spring having a relatively large wire diameter. In order to form the hot formed coil spring, a wire having a length equivalent to that of one coil spring is wound around the mandrel. Accordingly, before coiling, a plastic working portion having a shape corresponding to the purpose can be formed at an end portion of the wire.

In contrast, a coil spring formed by cold working is produced in such a way that a wire having a length equivalent to that of multiple coil springs is supplied between a first pin and a second pin of the coiling machine, and the wire is formed to be arc-shaped continuously between the first pin and the second pin. When the wire is formed into one coil spring, the wire is cut by a cutter. In this specification, an apparatus which produces a coil spring by cold working is referred to as a cold forming coiling machine, and the coil spring formed by cold working is referred to as a cold formed coil spring. The cold forming coiling machine can produce a coil spring of a special shape other than a cylindrical shape. For the cold formed coil spring, a long wire is used as the material, and each time the wire is formed into one coil spring, the wire is cut. Accordingly, it is difficult to form a plastic working portion having a shape corresponding to the purpose at an end portion of the wire before coiling.

JP2000-272535A or JP2008-18784A discloses a link-motion-type suspension. Link-motion-type can be rephrased as knee-action-type, and such a type of suspension comprises a link member which is rotated about a pivot up and down (i.e., rotated vertically), a lower spring seat provided on the link member, an upper spring seat provided on a vehicle body, a coil spring which urges the link member downward, and the like. The coil spring is arranged between the lower spring seat and the upper spring seat. The link member is rotated about the pivot in a vertical direction. Accordingly, depending on the position of the link member in the vertical direction, the inclination of the lower spring seat is varied.

A lower end turn portion of the coil spring is supported by the lower spring seat. An upper end turn portion of the coil spring is supported by the upper spring seat. Accordingly, when the link member is rotated vertically, not only is the amount of compression of the coil spring changed, but a phenomenon that the coil spring is curved (the so-called bowing) also occurs in accordance with the inclination of the lower end turn portion. In a coil spring having the bowing, variations in stress are large. Moreover, since the stress of the coil spring is greatly varied between a state in which the coil spring is compressed to the maximum (full bump) and a state in which the coil spring is extended to the maximum (rebound), stress amplitude is large. Accordingly, a further improvement has been desired in order to achieve stress reduction and weight reduction.

BRIEF SUMMARY OF THE INVENTION

An object of the present invention is to reduce stress amplitude in a coil spring for use in a link-motion-type suspension, and to provide a coil spring for a vehicle suspension which can be suitably produced by a hot forming coiling machine.

An embodiment of the present invention relates to a coil spring arranged between a lower spring seat and an upper spring seat of a link-motion-type suspension comprising a link member rotated in a vertical direction. The coil spring comprises a lower end turn portion which is in contact with the lower spring seat, an upper end turn portion which is in contact with the upper spring seat, an effective portion of a cylindrical shape between the lower end turn portion and the upper end turn portion, and a bowing control portion which is formed in at least one end turn portion of the lower end turn portion and the upper end turn portion. The bowing control portion includes a taper portion whose thickness is reduced from an intermediate portion of the end turn portion toward a distal end of a wire along its length, and suppresses bowing of the effective portion by absorbing a change in the inclination of the lower spring seat by the taper portion.

The shape of the taper portion can be, for example, flat tapered or round tapered, or the taper portion can be formed to have its end face polished. With respect to a coil spring according to the present invention, in a link-motion-type suspension in which a spring seat moves two-dimensionally or three-dimensionally in accordance with the movement of a link member, a bowing control portion including a taper portion in at least one of the upper and lower end turn portions is formed. By reducing the stiffness of the end turn portion by the taper portion, the majority of a change in the inclination of the spring seat is absorbed, and by preventing a reaction force of the spring seat from being transmitted to the effective portion, bowing of the effective portion is suppressed. That is, the coil spring of the present invention is an end-coil-stiffness-controlled spring in which the end turn portion controls the bowing of the effective portion.

According to the present invention, in the link-motion-type suspension, a change in the inclination of the spring seat when the link member is rotated vertically can be absorbed by deformation of the taper portion of the bowing control portion. As a result, bowing of the effective portion is suppressed, and the stress amplitude of the coil spring can be reduced. Moreover, the taper portion can be formed in advance by plastically working both ends of the wire before coiling the same. Accordingly, the coil spring can be produced by a hot forming coiling machine.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A coil spring for use in a link-motion-type suspension according to one embodiment of the present invention will now be described with reference to FIGS. 1 to 8.

Figure 1:
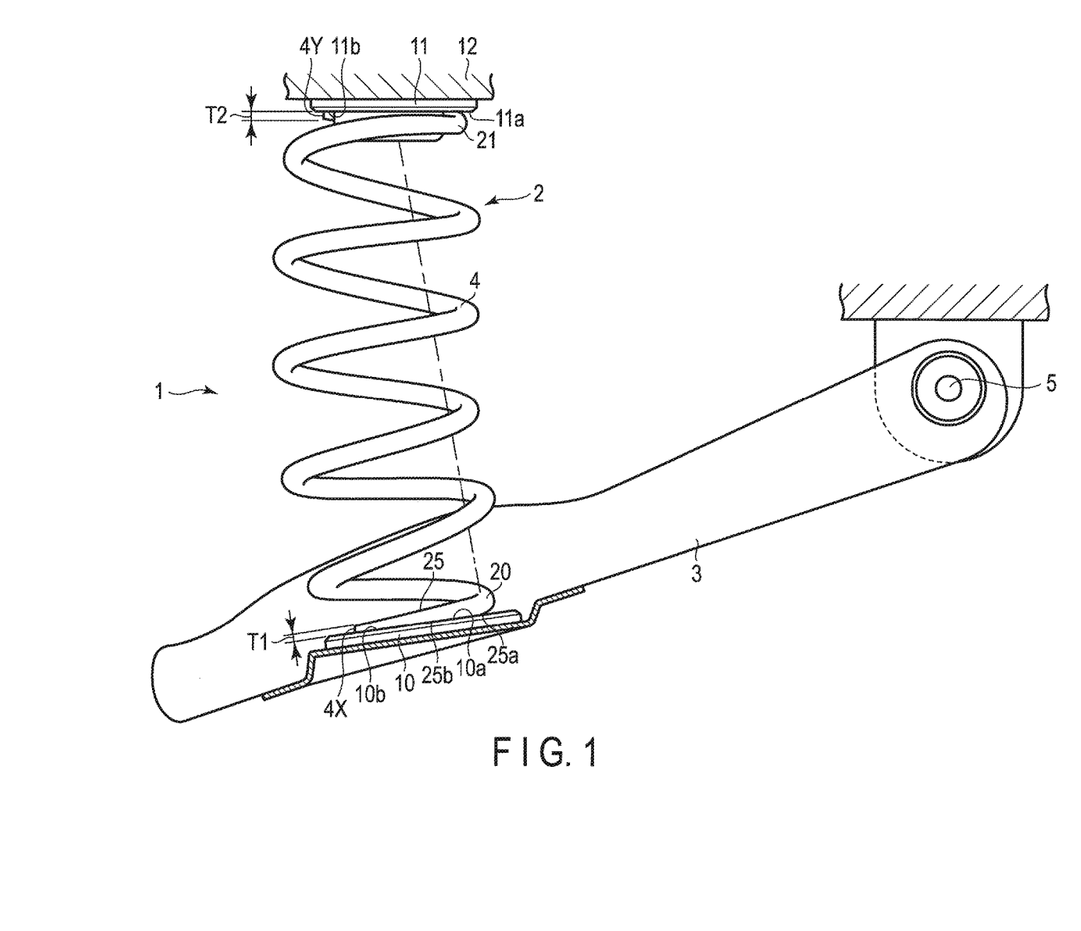
FIG. 1 shows a link-motion-type suspension comprising a coil spring according to a first embodiment, and is a cross-sectional view of the coil spring in a rebound position.

FIG. 1 schematically shows a link-motion-type suspension 1. The suspension 1 includes a coil spring 2 and a link member 3. The coil spring 2 includes a wire 4 made of spring steel which is formed into a helical shape. The link member 3 is rotated about a pivot (a pivot shaft) 5 vertically (upward and downward).

A lower spring seat 10 is provided on the link member 3. An upper spring seat 11 is provided above the lower spring seat 10. The upper spring seat 11 is arranged on a lower surface of a vehicle body member 12. The coil spring 2 is arranged in such a state that it is compressed between the lower spring seat 10 and the upper spring seat 11, and urges the link member 3 downward.

The lower spring seat 10 comprises a first support portion 10a which is on the side near to the pivot 5 and a second support portion 10b which is on the side far from, the pivot 5. Since the link member 3 is rotated about the pivot 5 in a vertical direction, the inclination of the lower spring seat 10 changes according to the position of the link member 3 in the vertical direction. Since the first support portion 10a of the lower spring seat 10 is near to the pivot 5, the height of the link member 3 is changed little when the link member 3 is rotated vertically. In contrast, since the second support portion 10b is far from the pivot 5, the height of the link member 3 is changed greatly when the link member 3 is rotated vertically.

Figure 2:
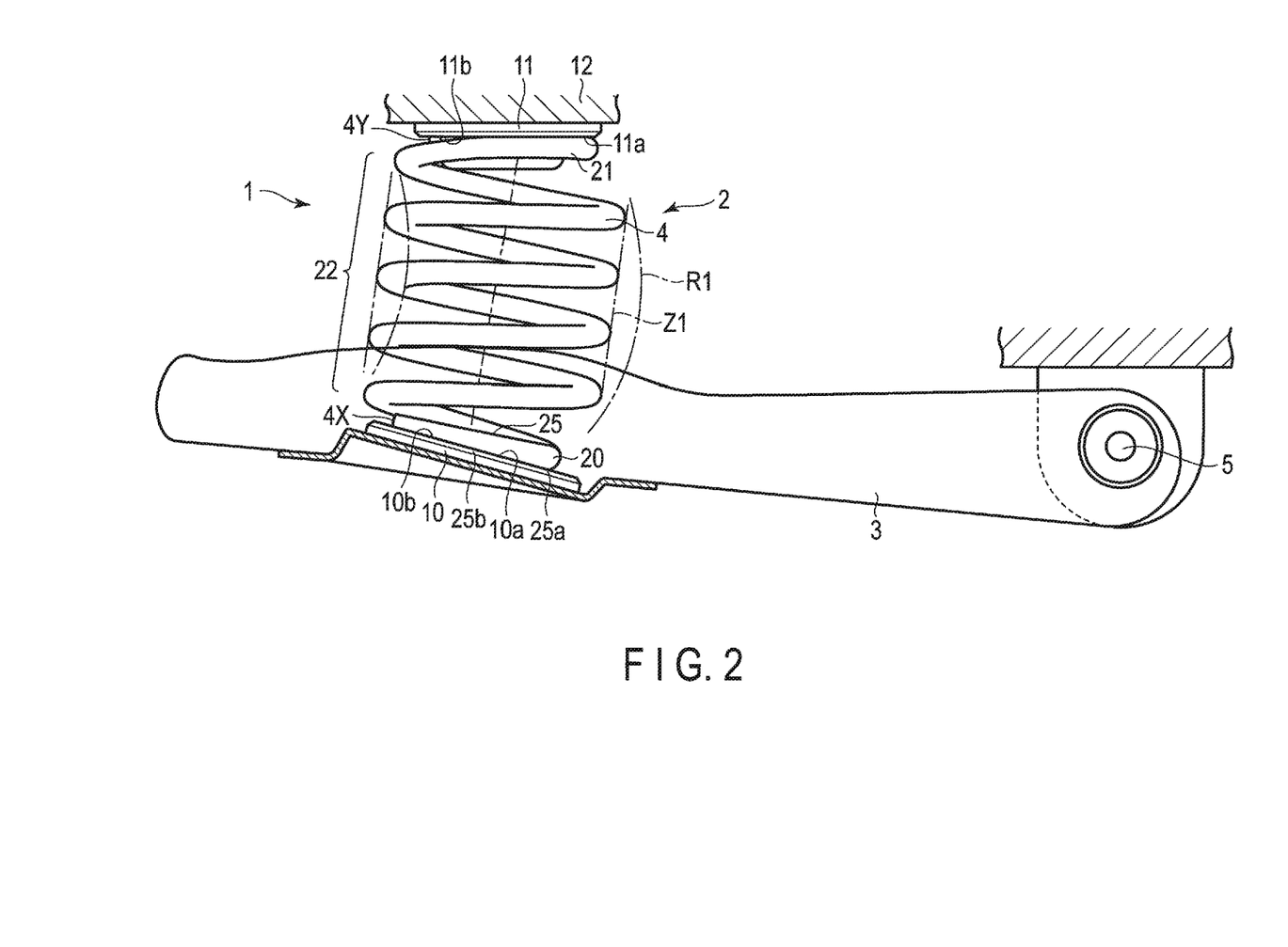
FIG. 2 is a cross-sectional view of the coil spring being compressed to a full bump position in the suspension shown in FIG. 1.

FIG. 1 shows the state where the coil spring 2 and the link member 3 are moved to a rebound position. The "rebound" state refers to a state where the coil spring is extended to the maximum when a vehicle body is lifted. FIG. 2 shows the state where the coil spring 2 and the link member 3 are moved to a full bump position. The "full bump" state refers to a state where the coil spring is compressed to the maximum by a load. The link member 3 is moved about the pivot 5 vertically in accordance with the amount of compression of the coil spring 2. That is, the coil spring 2 and the link member 3 are moved between the rebound position shown in FIG. 1 and the full bump position shown in FIG. 2.

Figure 3:
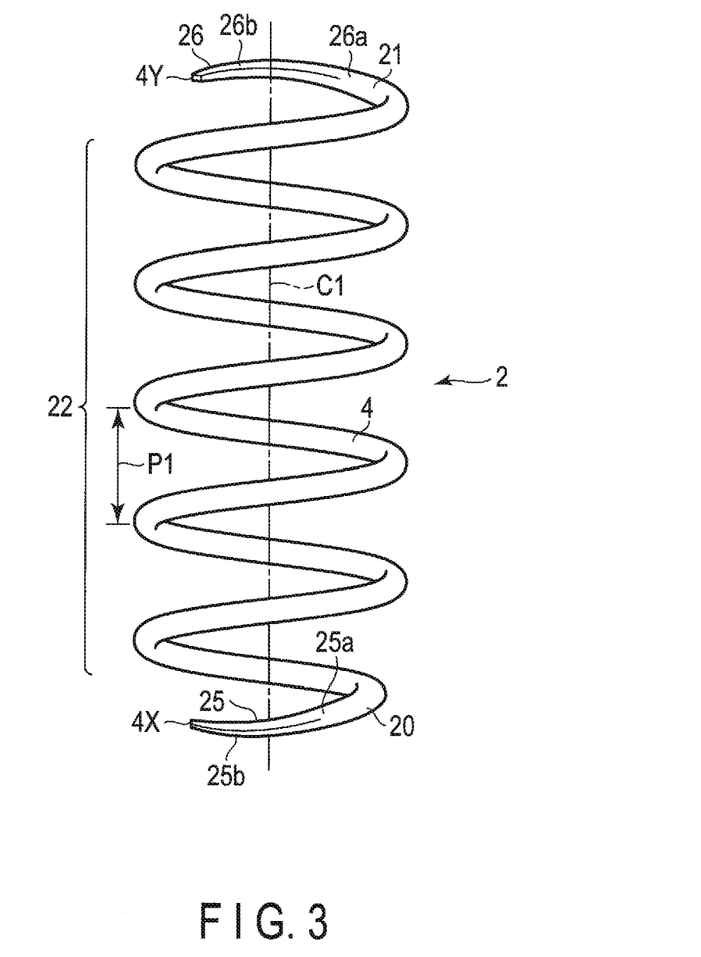
FIG. 3 is a side view of the coil spring in its free shape which is not compressed.

FIG. 3 shows the coil spring 2 in its free shape in which no compressive load is applied. When a compressive load along a coil central axis C1 is applied to the coil spring 2, the length of the coil spring 2 becomes less than that in the free state. The coil spring 2 includes a lower end turn portion 20 supported by the lower spring seat 10, an upper end turn portion 21 supported by the upper spring seat 11, and an effective portion 22 between the end turn portions 20 and 21. The effective portion 22 has a shape which is substantially free of bowing (i.e., cylindrical) in the free state in which no compressive load is applied. Pitch P1 of the effective portion 22 in the free state is substantially constant.

A lower surface of the lower end turn portion 20 is opposed to an upper surface of the lower spring seat 10. The lower end turn portion 20 is a part which contacts the lower spring seat 10 in a state in which the coil spring 2 is compressed, and refers to an area extending to a point around 0.6 to 0.7 turns, for example, from a lower distal end 4X of the wire 4. An upper surface of the upper end turn portion 21 is opposed to a lower surface of the upper spring seat 11. The upper end turn portion 21 is a part which contacts the upper spring seat 11 in a state in which the coil spring 2 is compressed, and refers to an area extending to a point around 0.8 turns, for example, from an upper distal end 4Y of the wire 4. The effective portion 22 is a portion where the adjacent winding portions of the wire 4 do not contact each other in a state in which the coil spring 2 is compressed to the maximum, and which functions effectively as a spring.

Figure 4:
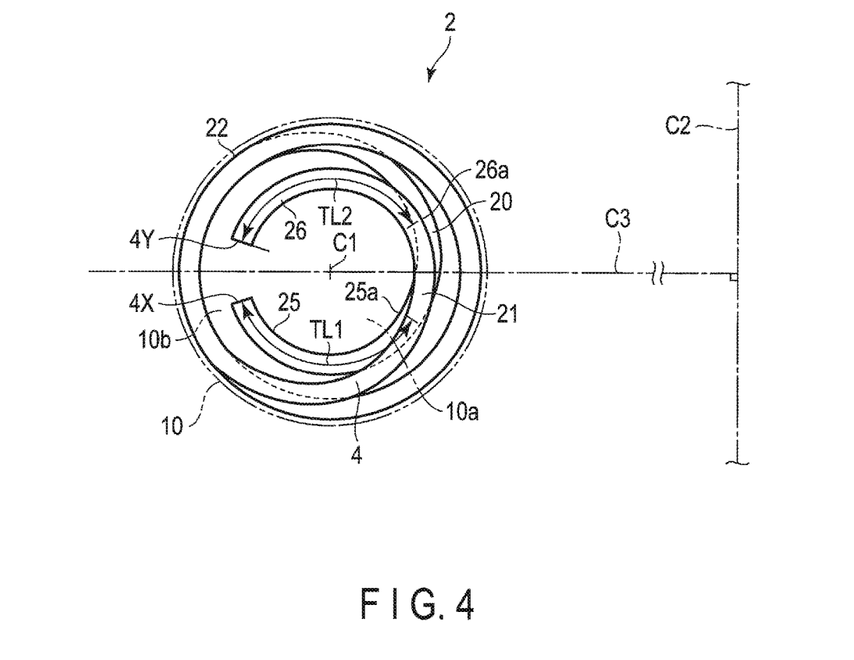
FIG. 4 is a plan view of the coil spring as seen from above.

FIG. 4 is a plan view of the coil spring 2 as seen from above. C2 in FIG. 4 represents a rotation central axis of the pivot 5. A line segment C3 connecting the rotation central axis C2 of the pivot 5 and a center C1 of the coil spring 2 extends in a longitudinal direction of the link member 3. Accordingly, the link member 3 rotates about the rotation central axis C2 of the pivot 5 along a vertical surface passing through the line segment C3.

The coil spring 2 includes a first taper portion 25 formed at the lower end side of the wire 4, and a second taper portion 26 formed at the upper end side of the wire 4. In the first taper portion 25, the thickness of the wire 4 is reduced in a tapered way for a first length TL1 (FIG. 4) from a first thickness varying portion 25a, which is provided in the middle of the lower end turn portion 20, toward the lower distal end 4X of the wire 4 along its length. In other words, the first thickness varying portion 25a is provided at an intermediate portion of the lower end turn portion 20. The diameter of the wire 4 is, for example, 12.8 mm. The first length TL1 is, for example, 180 mm, and is equivalent to 0.375 turns from the distal end 4X of the wire 4. The distal end 4X of the first taper portion 25 has a first taper thickness T1 (FIG. 1).

In the second taper portion 26, the thickness of the wire 4 is reduced in a tapered way for a second length TL2 (FIG. 4) from a second thickness varying portion 26a, which is provided in the middle of the upper end turn portion 21, toward the upper distal end 4Y of the wire 4 along its length. In other words, the second thickness varying portion 26a is provided at an intermediate portion of the upper end turn portion 21. The second length TL2 is, for example, 186 mm, and is equivalent to 0.525 turns from the distal end 4Y of the wire 4. The distal end 4Y of the second taper portion 26 has a second taper thickness T2 (FIG. 1).

The lower surface of the lower end turn portion 20 is opposed to the upper surface of the lower spring seat 10. The lower spring seat 10 includes the first support portion 10a which is on the side near to the pivot 5 and the second support portion 10b which is on the side far from the pivot 5. In other words, the lower spring seat 10 includes the first support portion. 10a at which a change in height of the first support portion. 10a when the link member 3 is rotated vertically is small, and the second support portion 10b at which the change in height is large. The first support portion 10a supports a portion near the pivot 5 of the lower surface of the lower end turn portion 20. The second support portion 10b supports a portion far from the pivot 5 of the lower surface of the lower end turn portion 20.

The upper surface of the upper end turn portion 21 is opposed to the lower surface of the upper spring seat 11. The upper spring seat 11 includes a third support portion 11a which is on the side near to the pivot 5 and a fourth support portion lib which is on the side far from the pivot 5. The third support portion 11a supports a portion near the pivot 5 of the upper surface of the upper end turn portion 21. The fourth support portion 11b supports a portion far from the pivot 5 of the upper surface of the upper end turn portion 21.

As shown in FIG. 4, the first taper portion 25 extends in the direction from the first support portion 10a of the lower spring seat 10 to the second support portion 10b. The second taper portion 26 extends in the direction from the third support portion 11a of the upper spring seat 11 to the fourth support portion 11b. A lower surface 25b of the first taper portion 25 is in contact with the second support portion 10b of the lower spring seat 10. The lower end turn portion 20 is supported by the lower spring seat 10 stably. An upper surface 26b of the second taper portion 26 is in contact with the third support portion 11a of the upper spring seat 11. The upper end turn portion 21 is supported by the upper spring seat 11 stably.

In the case of this embodiment, the link member 3 is rotated about the pivot 5 vertically. However, depending on the type of the suspension, the link member may perform a three-dimensional complicated movement such as rotating about a different pivot in addition to two-dimensional rotation about a specific pivot. Accordingly, the optimum positions of the taper portions 25 and 26 may be changed depending on the suspension. When the coil spring 2 is compressed, the contact force concentrates on the thickness varying portions 25a and 26a, but the places where the contact force concentrates change depending on the state of compression.

Figure 5:
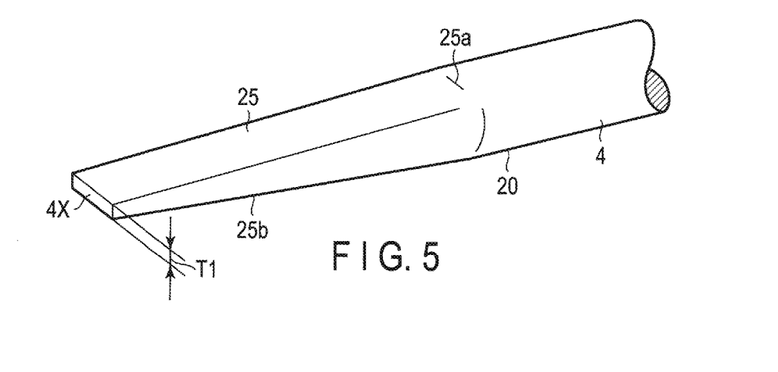
FIG. 5 is a perspective view of a taper portion of a wire of the coil spring.
Figure 6:
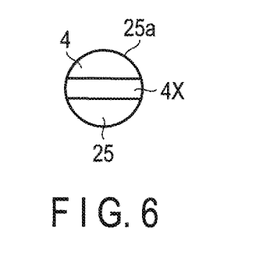
FIG. 6 is a front view of the taper portion of the wire of the coil spring.

FIG. 5 shows the lower end turn portion 20 extended linearly. At the lower end side of the wire 4, the taper portion 25 is formed from the first thickness varying portion 25a, which is provided in the middle of the end turn portion 20, to the distal end 4X of the wire 4 along its length. Bending stiffness of the wire 4 is gradually reduced from the first thickness varying portion 25a toward the distal end 4X of the wire 4. FIG. 6 is a front view of the wire 4 as seen from the distal end 4X. At the upper end side of the wire 4, the taper portion 26 is formed from the second thickness varying portion. 26a, which is provided in the middle of the end turn portion 21, to the distal end 4Y of the wire 4 along its length. Bending stiffness of the wire 4 is gradually reduced from the second thickness varying portion 26a toward the distal end 4Y of the wire 4.

Figure 7:
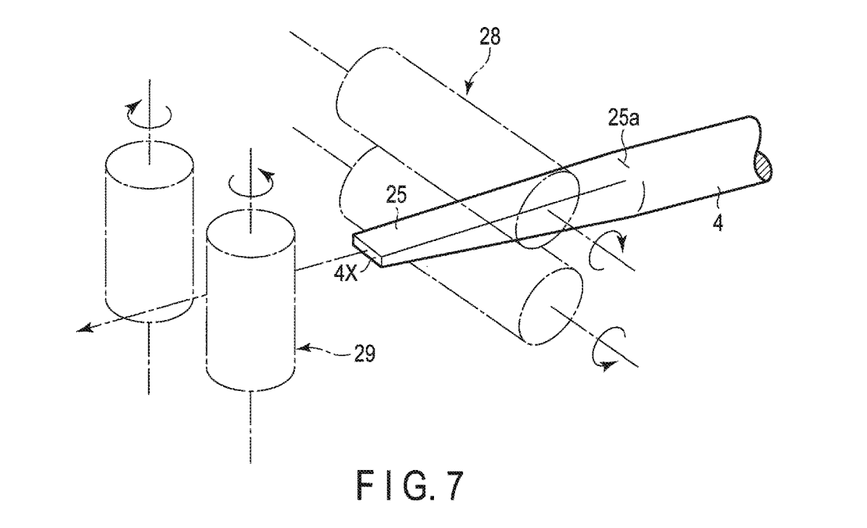
FIG. 7 is a perspective view showing a part of an apparatus which processes the taper portion of the wire of the coil spring.

FIG. 7 shows a part of an apparatus which plastically works the first taper portion 25 and the second taper portion 26. After rolling out the wire 4 by a pair of horizontal rolling rollers 28 with pressure applied from up and down, the wire 4 is rolled out by a pair of vertical rolling rollers 29 with pressure applied from right and left. By repeating this operation several times, on an end portion of the wire 4, the first taper portion 25 of a flat tapered shape is formed from the first thickness varying portion 25a to the distal end 4X of the wire 4. The width of the flat tapered first taper portion 25 is substantially equal to the diameter of the wire 4. Also on the other end portion of the wire 4, the second taper portion 26 having a flat tapered shape is formed. Each of an upper surface and a lower surface of the flat tapered taper portion is substantially flat.

The coil spring 2 of the present embodiment includes the first taper portion 25 formed at the lower end turn portion 20, and the second taper portion 26 formed at the upper end turn portion 21. The first taper portion 25 extends in the direction from the first support portion 10a of the lower spring seat 10 to the second support portion 10b. As the first taper portion 25 described above is formed in the lower end turn portion 20, the bending stiffness of the wire 4 from the thickness varying portion 25a of the lower end turn portion 20 to the distal end 4X of the wire 4 is controlled. The second taper portion 26 extends in the direction from the third support portion 11a of the upper spring seat 11 to the fourth support portion 11b. As the second taper portion 26 is formed in the upper end turn portion 21, the bending stiffness of the wire 4 from the thickness varying portion. 26a of the upper end turn portion 21 to the distal end 4Y of the wire 4 is controlled.

Even in a state in which the coil spring 2 of the present embodiment is compressed to the full bump position as shown in FIG. 2, bowing does not occur in the effective portion 22, and the coil spring 2 can substantially keep its cylindrical shape. A one-dot chain line Z1 in FIG. 2 represents the position of the outer circumference of the effective portion 22 of the coil spring 2. A large rotational movement of the spring seat 10 is absorbed by deformation of the end turn portion 20 whose stiffness is small. That is, bowing in the effective portion 22 can be suppressed by the end turn portion 20. As a result, stress amplitude of the effective portion 22 can be reduced, and reduction of the weight of the coil spring can be achieved. In contrast, in a conventional coil spring not having a taper portion at the end turn portion, bowing occurs in the effective portion as shown by a curved line R1 in FIG. 2.

Figure 8:
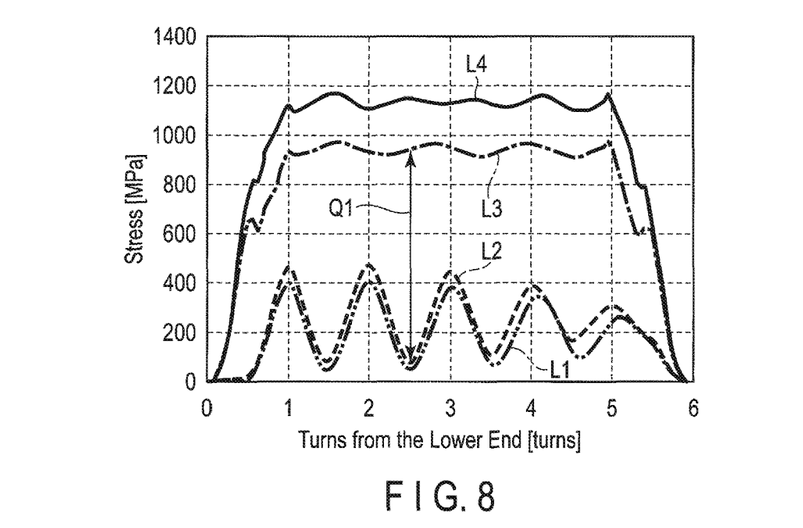
FIG. 8 is a graph showing stress of the coil spring in a rebound position and stress of the same in a full bump position.

FIG. 8 shows stress of the coil spring 2 of the present embodiment in the rebound position, and stress of the same in the full bump position. Lines L1 and L2 in FIG. 8 represent the maximum principal stress and the maximum shear stress of the coil spring 2, respectively, when the coil spring 2 is in the rebound position. Lines L3 and L4 in FIG. 8 represent the maximum principal stress and the maximum shear stress of the coil spring 2, respectively, when the coil spring 2 is in the full bump position. The coil spring 2 of the present embodiment has a small stress peak in the full bump position, and moreover, a change in the stress of the effective portion is small. Accordingly, a difference between stress in the rebound position and stress in the full bump position (stress amplitude Q1) is smaller than stress amplitude Q2 (FIG. 9) of a conventional coil spring.

Figure 9:
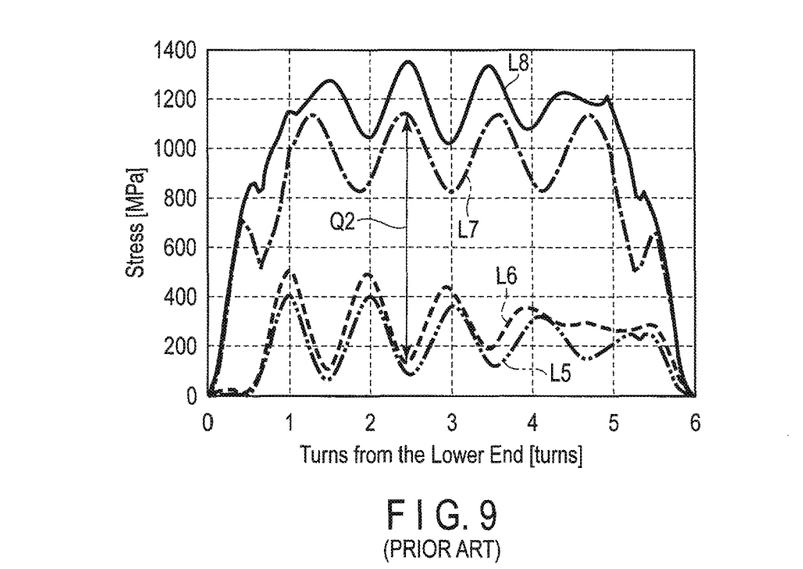
FIG. 9 is a graph showing stress of a conventional coil spring in a rebound position and stress of the same in a full bump position.

FIG. 9 shows stress of the conventional coil spring not having a taper portion in the end turn portion in the rebound position, and stress of the same in the full bump position. Lines L5 and L6 in FIG. 9 represent the maximum principal stress and the maximum shear stress of the conventional coil spring, respectively, when the conventional coil spring is in the rebound position. Lines L7 and L8 in FIG. 9 represent the maximum principal stress and the maximum shear stress of the conventional coil spring, respectively, when the conventional coil spring is in the full bump position. The conventional coil spring has a high stress peak in the full bump position. Stress amplitude Q2 of the conventional coil spring is greater than stress amplitude Q1 (FIG. 8) of the coil spring of the present embodiment.

Figure 10:
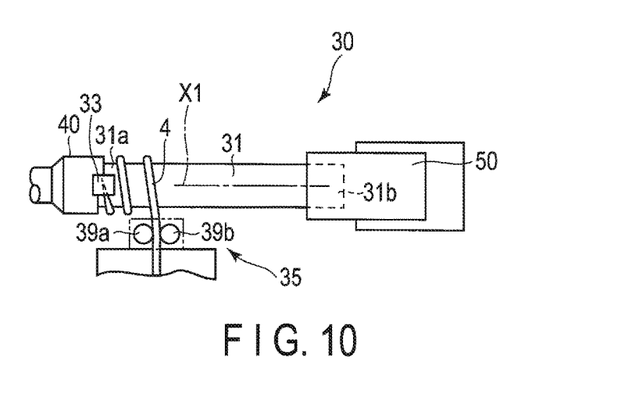
FIG. 10 is a plan view of a hot forming coiling machine.

FIG. 10 shows an example of a hot forming coiling machine 30 for producing a coil spring. The coiling machine 30 includes a columnar mandrel 31, a chuck 33, and a guide portion 35. An end portion 31a on one side of the mandrel 31 has a shape corresponding to the end turn portion on one end (the winding start side) of the coil spring. The guide portion 35 includes guide members 39a and 39b.

The wire 4 formed of spring steel is cut in a length equivalent to a length of one coil spring in advance. The wire 4 is heated to an austenitizing temperature (i.e., higher than $A_3$ transformation point and lower than 1150° C.), and supplied to the mandrel 31 by a feed mechanism. The chuck 33 fixes a distal end of the wire 4 to the mandrel 31. The guide portion 35 controls the position of the wire 4 wound around the mandrel 31. The end portion 31a on one side of the mandrel 31 is held by a mandrel drive head 40. The mandrel 31 rotates about axis X1 by the mandrel drive head 40. An end portion 31b on the other side of the mandrel 31 is rotatably supported by a mandrel holder 50. The guide portion 35 moves in the direction along axis X1 of the mandrel 31, and guides the wire 4 in accordance with a pitch angle of the coil spring to be formed.

The wire 4 has a length equivalent to a length of one coil spring. The wire 4 is heated to a temperature suitable for hot forming by a furnace. A distal end of the heated wire 4 is fixed to the mandrel 31 by the chuck 33. In addition to rotation of the mandrel 31, the guide portion 35 moves in the direction along axis X1 of the mandrel 31 in synchronization with the rotation of the mandrel 31. The wire 4 is thereby wound around the mandrel 31 at a predetermined pitch. The above explanation applies to a case of producing a coil spring by the hot forming coiling machine 30. The coil spring of the present embodiment can also be produced by a cold forming coiling machine.

Figure 11:
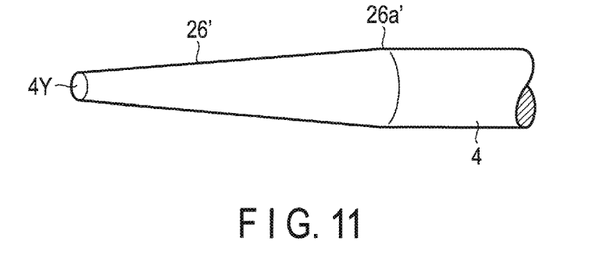
FIG. 11 is a perspective view of a taper portion according to a second embodiment.
Figure 12:
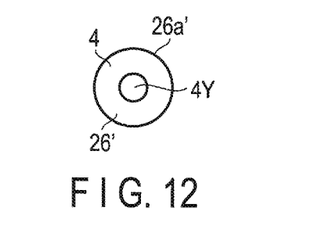
FIG. 12 is a front view of the taper portion shown in FIG. 11.

FIG. 11 shows a taper portion 26' of a round tapered shape formed at the end of a wire 4 of a coil spring according to a second embodiment. FIG. 12 is a front view of the taper portion 26' as seen from a distal end 4Y. In the taper portion 26', the diameter of the wire 4 is gradually reduced from a thickness varying portion 26a' toward the distal end 4Y of the wire 4 so that the wire 4 is evenly reduced in a tapered way.

The round tapered taper portion 26' has a rotationally symmetric shape about the axis of the wire 4. When forming a coil spring by the hot forming coiling machine 30 (FIG. 10), the end turn portion on the winding end side should preferably be formed as the round tapered taper portion 26'. The reason for this is that it is difficult to accurately control the position of the end turn portion on the winding end side because the wire 4 is twisted about the axis during coiling. Therefore, by adopting the round tapered taper portion 26' at the end turn portion on the winding end side, it is possible to avoid the effect of torsion of the wire 4. Since the position of the end turn portion on the winding start side can be restricted by the chuck 33, a flat tapered taper portion 25 is adopted. As described above, one of the first taper portion and the second taper portion may be of a flat tapered shape, and the remaining one may be of a round tapered shape.

Figure 13:
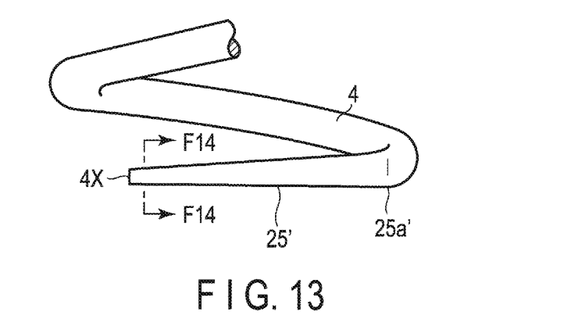
FIG. 13 is a side view of a taper portion according to a third embodiment.
Figure 14:
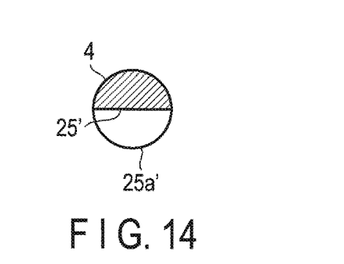
FIG. 14 is cross-sectional view of the taper portion taken along line F14-F14 of FIG. 13.

FIG. 13 shows a taper portion 25' of a wire 4 of a coil spring according to a third embodiment. FIG. 14 shows a cross section of the taper portion 25' shown in FIG. 13. By polishing or grinding an end face of an end portion of the wire 4 obtained after coiling by a grinder, etc., the taper portion 25' of a type whose end face is polished is formed. The thickness of the taper portion 25' is reduced in a tapered way from a thickness varying portion 25a' toward a distal end 4X of the wire 4. In the case of a cold formed coil spring, after coiling the wire, the taper portion 25' of the type whose end face is polished can be formed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle suspension coil spring arranged between a lower spring seat and an upper spring seat of a link-motion-type suspension comprising a link member rotatable in a vertical direction, an inclination of the lower spring seat being changed in accordance with a position of the link member in the vertical direction, the lower spring seat including a first support portion at a first side thereof and a second support portion at a second side thereof, the first side being nearer to a pivot of the link member than the second side, and the coil spring comprising:
    a lower end turn portion which is in contact with the lower spring seat;
    an upper end turn portion which is in contact with the upper spring seat;
    an effective portion of a cylindrical shape between the lower end turn portion and the upper end turn portion; and
    a bowing control portion comprising a taper portion whose thickness and bending stiffness are reduced from a thickness varying portion of the lower end turn portion toward a lower distal end of a wire along its length, the thickness varying portion being disposed on the first support portion and the lower distal end of the wire being disposed on the second support portion,
    wherein the bowing control portion suppresses bowing of the effective portion by absorbing a change in the inclination of the lower spring seat by the taper portion.

2. The vehicle suspension coil spring of claim 1, wherein the taper portion of the bowing control portion has a flat tapered shape.

3. The vehicle suspension coil spring of claim 1, wherein the taper portion of the bowing control portion has a round tapered shape.

4. The vehicle suspension coil spring of claim 1, wherein the taper portion of the bowing control portion is of a type whose end face is polished.

5. The vehicle suspension coil spring of claim 1, wherein the effective portion of the cylindrical shape is hot formed.

6. A vehicle suspension coil spring arranged between a lower spring seat and an upper spring seat of a link-motion-type suspension comprising a link member rotatable in a vertical direction, an inclination of the lower spring seat being changed in accordance with a position of the link member in the vertical direction, the upper spring seat including a third support portion at a first side thereof and a fourth support portion on a second side thereof, the first side being nearer to a pivot of the link member than the second side, and the coil spring comprising:
   a lower end turn portion which is in contact with the lower spring seat;
   an upper end turn portion which is in contact with the upper spring seat;
   an effective portion of a cylindrical shape between the lower end turn portion and the upper end turn portion; and
   a bowing control portion comprising a taper portion whose thickness and bending stiffness are reduced from a thickness varying portion of the upper end turn portion toward an upper distal end of a wire along its length, the thickness varying portion being disposed on the third support portion and the upper distal end of the wire being disposed on the fourth support portion,
   wherein the bowing control portion suppresses bowing of the effective portion by absorbing a change in the inclination of the lower spring seat by the taper portion.

7. A vehicle suspension coil spring arranged between a lower spring seat and an upper spring seat of a link-motion-type suspension comprising a link member rotatable in a vertical direction, an inclination of the lower spring seat being changed in accordance with a position of the link member in the vertical direction, the lower spring seat including a first support portion at a first side thereof and a second support portion at a second side thereof, the first side of the lower spring seat being nearer to a pivot of the link member than the second side of the lower spring seat, the upper spring seat including a third support portion at a first side thereof and a fourth support portion at a second side thereof, the first side of the upper spring seat being nearer to the pivot than the second side of the upper spring seat, and the coil spring comprising:
   a lower end turn portion which is in contact with the lower spring seat;
   an upper end turn portion which is in contact with the upper spring seat;
   an effective portion of a cylindrical shape between the lower end turn portion and the upper end turn portion; and
   a bowing control portion comprising (i) a first taper portion whose thickness and bending stiffness are reduced from a first thickness varying portion of the lower end turn portion toward a lower distal end of a wire along its length, the first thickness varying portion being disposed on the first support portion and the lower distal end of the wire being disposed on the second support portion, and (ii) a second taper portion whose thickness and bending stiffness are reduced from a second thickness varying portion of the upper end turn portion toward an upper distal end of the wire along its length, the second thickness varying portion being disposed on the third support portion and the upper distal end of the wire being disposed on the fourth support portion,
   wherein the bowing control portion suppresses bowing of the effective portion by absorbing a change in the inclination of the lower spring seat by the first and second taper portions.

8. The vehicle suspension coil spring of claim 7, wherein one of the first taper portion and the second taper portion of the bowing control portion is of a flat tapered shape, and the other is of a round tapered shape.

* * * * *